United States Patent [19]

Reum

[11] Patent Number: 5,408,524

[45] Date of Patent: Apr. 18, 1995

[54] ANSWER SUPERVISION OVER PULSE CODE MODULATED CARRIER SYSTEM AND METHOD THEREFORE

[75] Inventor: Peter M. Reum, Littleton, Colo.

[73] Assignee: Xel Communications, Inc., Aurora, Colo.

[21] Appl. No.: 38,796

[22] Filed: Mar. 29, 1993

[51] Int. Cl.⁶ .................. H04M 1/00; H04M 7/00; H04M 3/00; H04J 3/12

[52] U.S. Cl. .................. 379/157; 379/231; 379/252; 379/382; 379/399; 370/110.1

[58] Field of Search ............. 379/112, 13, 121, 123, 379/134, 230, 231, 232, 382, 399, 10, 15, 252; 370/13, 17, 110.1; 375/106, 165

[56] References Cited

U.S. PATENT DOCUMENTS

| | | | |
|---|---|---|---|
| 4,413,335 | 11/1983 | Clements et al. | 379/10 X |
| 4,421,951 | 12/1983 | Van Basse | 379/382 X |
| 4,636,584 | 1/1987 | Binkerd et al. | 379/240 |
| 4,916,233 | 4/1990 | Smith et al. | 379/112 |
| 4,926,467 | 5/1990 | Meier | 379/252 X |
| 4,926,469 | 5/1990 | Smith et al. | 379/112 |
| 5,134,651 | 7/1992 | Ortiz et al. | 379/112 |
| 5,202,919 | 4/1993 | Kiko | 375/399 |

OTHER PUBLICATIONS

"The D4 Digital Channel Bank Family", Nov. 1982, The Bell System Technical Journal, pp. 2605–2625.

*Primary Examiner*—Stephen Chin
*Assistant Examiner*—Paul Loomis
*Attorney, Agent, or Firm*—Dorr, Carson, Sloan & Peterson

[57] ABSTRACT

A system for supervising a telephone connection using over a pulse code modulated carrier network between a first customer's equipment and a second customer's equipment. A first channel unit is located in a channel bank serving the first customer's telephone equipment. A second channel unit is located in a channel bank at a remote central office that is geographically remote from the first customer's equipment. The second channel unit is coupled to the second customer's equipment through a switch at the remote Central Office. The second channel unit includes a means for detecting a reverse battery signal generated by the Central Office when the second customer's telephone goes off-hook, and a means for converting the reverse battery signal into a digital supervisory signal. The second channel unit transmits the digital supervisory signal, preferably using the A and B signalling bits on a pulse code modulated carrier system.

The first channel unit includes an input coupled the PCM carrier and an output coupled to the first customer's telephone equipment. The first channel unit receives the digital supervisory signal and converts the digital supervisory signal to a reverse battery signal, and provides the reverse battery signal to the first customer's telephone equipment.

17 Claims, 5 Drawing Sheets

| STATE NO. | CPE 11 | | CHANNEL UNIT 224 | | CARRIER NETWORK (FXSAS) TA TB RA RB (FXOAS) RA RB TA TB | CHANNEL UNIT 124 | | SWITCH 24 | |
|---|---|---|---|---|---|---|---|---|---|
| | TIP | RING | TIP | RING | | TIP | RING | TIP | RING |
| 1 | OPEN | OPEN | OPEN | BAT | 1 1 1 1 | OPEN | OPEN | OPEN | BAT |
| 2 | OPEN | GND | OPEN | BAT | 0 0 1 1 | OPEN | GND | OPEN | BAT |
| 3 | STATION LOOP CLOSURE | | GND | BAT | 0 0 1 1 | OPEN | GND | GND | BAT |
| 4 | | | GND | BAT | 0 0 1 1 | OFFICE LOOP CLOSURE | | GND | BAT |
| 5 | | | GND | BAT | 0 0 1 1 | | | GND | BAT |
| 6 | | | BAT | GND | 0 0 0 0 | | | BAT | GND |

ANSWER SUPERVISION OVER PULSE CODE MODULATED CARRIER SYSTEM AND METHOD THEREFORE

BACKGROUND OF INVENTION

1. Field of the Invention

The present invention relates in general to telecommunications methods and apparatuses and, in particular, pertains to the delivery of answer supervision information from a central office connected to a called party's telephone, through a pulse code modulated carrier to a channel unit coupled to a calling party's telephone equipment for automatic notification to the calling party that the called party has answered.

2. Statement of the Problem

Telephone customers such as hotels and office buildings typically install public branch exchanges (PBX) which allow a number of telephones to access the telephone network through a single telephone network channel. It is important to these users that each telephone served by the PBX is charged accurately for the time the telephone is used, especially for toll connections. Ideally, telephone charges should begin as soon as a connection is made. Therefore, it is important to know precisely when the called party answers their phone. The ability to provide information about when a called party has answered a call is referred to as "answer supervision".

Normally, the Central Office (CO) of a local telephone company detects when the called party lifts the hand-set creating an off-hook condition which completes an electric loop from the Central Office. The telephone company starts billing the call from the moment it detects the loop completion. The answer supervision information is passed on to inter-exchange carriers, i.e., the American Telephone and Telegraph Company (AT&T), U.S. Sprint, MCI. Unfortunately, conventional business telephone service does not ordinarily include access to the answer supervision signal.

In the past, all telephone communications occurred through simple wires known as "metallic" interconnections that carried both AC and DC information. Metallic interconnections carry both voice information in the form of electric waveforms, as well as some signal data in the form of direct current signals. An important example of a DC signal is a "reverse battery" signal generated by a Central Office to indicate when a telephone is answered. A reverse battery signal is generated by applying battery voltage (−48 V) to a telephone Tip lead which is normally coupled to ground, and applying ground to the telephone Ring lead which is normally coupled to battery voltage. Answer supervision is provided by the reverse battery signal, and allows telephone companies to accurately charge customers for phone calls upon detection.

Historically, only telephone companies needed answer supervision information since they were the only entity to bill customers for telephone service. Thus, there was little need to make the answer supervision signal available to customers and their telephone equipment. Recently, however, owners of hotel and office building PBXs have desired improved ability to monitor connection time so they can charge individual users accurately. In response, some newer Central Office equipment is capable of sending a reverse battery answer supervision signal to a calling PBX. An example of a Central Office switch circuit capable of providing the reverse battery signal is a DMS100 which is currently supported by software to provide reverse battery answer supervision. Another switch, a 5ESS includes reverse battery circuitry, but is not currently supported by software to provide answer supervision. An older and more common switch is a 1A, which does not even contain the reverse battery circuitry, and so cannot provide answer supervision. Even when this circuitry is included in the Central Office, however, special software drivers are required to provide answer supervision to the PBX. Also, this type of answer supervision is available for only a limited range of calls because the connection from the calling PBX to the Central Office must be made entirely on a metallic network.

Figure 1:
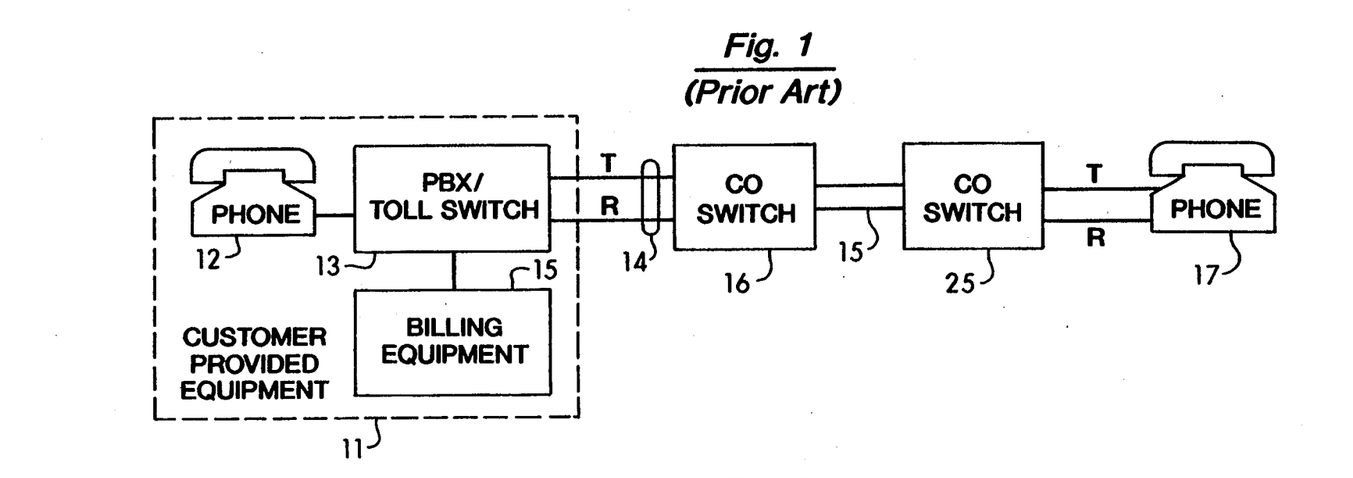
FIG. 1 (Prior Art) shows a block diagram of a prior art answer supervision system provided through metallic interconnect network.

FIG. 1 (prior art) illustrates a typical network for providing answer supervision to customer provided equipment (CPE) indicated by dashed box 11. Customer provided equipment 11 includes calling telephone 12 coupled to metallic network 11 through private branch exchange (PBX) 13. Metallic network 11 is illustrated as a two wire interconnect including a Tip lead (T) and a Ring lead (R) commonly used to couple private telephone equipment with a public telephone network. PBX 13 may also be a toll switch.

Using a ground start protocol, when a call originates from CPE 11, PBX 13 connects the Ring lead (R) to a ground potential. Central Office (CO) 16 senses the current on the Ring lead, and acknowledges the connect request by placing a ground potential on the Tip lead of PBX 13. PBX 13 senses the tip ground, makes the loop switch, and removes the ground connection to the Ring lead. At this point, PBX 13 receives a dial tone, and issues pulse dialing or Dual Tone MultiFrequency (DTMF) dialing instructions over metallic network 14.

CO switch 16 attempts to make a connection to called telephone equipment 17 through the CO switch 25 which serves called party's telephone equipment 17. If called telephone 17 is off-hook, and therefore busy, a busy signal will be returned by the CO switch 25 to the calling PBX 13. On the other hand, if the called telephone equipment 17 is not busy, CO switch 25 applies a ringing voltage to the Ring lead (R) of called telephone equipment 17. The ringing voltage is typically a 20 Hz signal having a cadence of two seconds on, four seconds off. The ringing voltage causes called telephone 17 to ring. At the same time, an audible ring back is transmitted by the called party's CO switch 25 to PBX 13 so that the calling party is aware that an attempt is being made to alert the called party of an incoming call.

The preceding steps can be accomplished on both metallic networks and over PCM carriers. The ground-start signalling information is transferred across the PCM carrier using A/B signalling, also called "robbed bit" signalling. U.S. Pat. No. 4,636,584 sets forth a signaling protocol for a channel unit for converting the A and B signaling bits to high and low logic signals.

When called telephone 17 is answered by lifting the handset off-hook, the off-hook condition is detected by CO switch 25. CO switch 25 responds to the off-hook condition by removing the ringing voltage. CO switch 25 transmits a 37 common channel" signal indicating that called telephone 17 has answered over interoffice pipeline 15 to CO switch 16. Common channel signalling uses a dedicated data transmission line separate from the message data line to transmit signal and control data between CO switch 16 and CO switch 25. Where Central Office 16 is a typical Central Office switch, it is not capable of returning any kind of indication to PBX 13 that called telephone 17 has answered. If, on the other hand, Central Office 16 includes circuitry for providing reverse battery signalling, and Central Office 16 includes the necessary software, Central Office 16 generates a reverse battery signal by applying battery to the Tip lead and ground to the Ring lead of PBX 13.

PBX 13 uses the answer supervision signal to provide additional services to the telephone user, such as to activate billing equipment 15. It should be understood that in the prior art answer supervision circuit illustrated in FIG. 1, the reverse battery signal can only be transferred by Central Office 16 over a short distance metallic interconnection 16. Thus, if Central Office 16 were separated from PBX 13 by any kind of digital transmission line, the reverse battery signal could not be provided to PBX 13. Until now, only customers that were fortunate enough to be located geographically close to a CO switch that provide reverse battery answer supervision could use the reverse battery signal. Customer's that were served by a typical CO switch without reverse battery capability simply could not obtain the benefits of receiving an answer supervision signal. A need exists to provide a reverse battery answer supervision signal to customers who are geographically distanced from a CO switch that provides reverse battery answer supervision signals.

Telephone companies continue to replace large parts of the metallic interconnect network with digital carrier networks. Digital carrier networks involve processing an analog voice signal by circuitry that converts the analog signal into a digital signal and combining the digital signals from many sources by time division multiplexing (TDM). The circuitry that performs the conversion and TDM is called a channel unit. Many channel units are combined, together with interface circuitry, to form a "channel bank" located at a remote Central Office (shown in FIG. 2). The channel bank transmits the multiplexed digital signal on a pulse code modulated (PCM) carrier such as a T-carrier transmission line. AT & T provides the D4 digital channel bank family commercially to operating companies and other telephone companies. The characteristics of the D4 digital channel bank family are fully discussed in the November, 1982, Volume 61, No. 9, Part 3, issue of the Bell System Technical Journal entitled "The D4 Digital Channel Bank Family."

One problem with PCM carrier systems is that signal information is not always transmitted between the Central Office and the calling customer's equipment. In particular, the reverse battery signal traditionally used for call supervision can only be transmitted on metallic networks because it is a direct current signal. Until now, no provisions have been made to communicate reverse battery information across a PCM carrier on a ground start FX line. Because the originating telephone equipment did not have access to the answer supervision signal, telephony designers have provided answer supervision by 1) voice detection 2) ring cadence detection, and 3) timing after the last digit dialed. Each of these methods enjoy some success, but require complex logic and remain plagued by false answer detection or no detection when a call is in fact answered. These errors result in erroneous charges or no charges at all, and are a consequence of inexact answer supervision.

U.S. Pat. No. 4,916,733 issued to Smith et al in April, 1990 shows an apparatus which generates an answer supervision signal by measuring the timing cadence of tones received by the calling telephone equipment. Because the calling equipment will usually receive tones having a regular cadence, such as a ring back signal, answering can be detected by an abrupt change in the cadence of the received tones. However, this system depends on regular cadence provided by the U.S. telephone network, and fails to detect answering when the called telephone equipment is in another country.

U.S. Pat. No. 4,926,469 issued to Smith et al on May, 1990 discloses an apparatus for providing answer supervision to privately owned pay telephone equipment. This apparatus includes a microprocessor for analyzing tones received by the calling telephone while waiting for the called telephone to answer. This apparatus improves upon the '733 apparatus by providing more complex tone analysis to distinguish between an answered call, and noise caused by signals such as busy signal.

U.S. Pat. No. 5,134,651 issued to Ortiz et al on Jul. 28, 1992 discloses a method an apparatus for providing answer supervision by transmitting a 2,100 Hz. tone towards the called telephone, and monitoring the receive line of the calling telephone equipment. Because the audible tone is received back into the calling telephone equipment only when the circuit between the Central Office and the called telephone is completed, the returned tone indicates the called telephone equipment has answered. Nevertheless, the '651 patent provides answer supervision by generating a derived answer supervision signal, and does not provide access to an answer supervision signal generated by the Central Office serving the called telephone equipment.

A simple and common method for providing answer supervision is to measure elapsed time from the last digit dialed, and to assume that the called telephone has answered after a predetermined time interval. Typically a forty-five second time interval is used, which allows about seven to eight rings before the called party is assumed to have answered. Because billing is started only after the predetermined time interval, any call that answers in less than the predetermined time is billed less than it should. In fact, if a call is completed before the predetermined time, no billing would occur, even though the owner of the PBX would be billed by the telephone company (which has answer supervision for internal use) for the connection. Similarly, a persistent caller who waits for more than about seven to eight rings for an answer will be charged as if a connection were made even if the called party never answers. This results in customer dissatisfaction.

A need exists for an apparatus that sends answer supervision information generated by a Central Office, such as local Central Office 16 to a customer, most notably a hotel or motel with their own PBX such as PBX 13, to allow the customer to provide accurate billing that commences with the return of the answer supervision information. Likewise, a need exists for an apparatus that provides the answer supervision signal, such as a reverse battery signal, in a format that is compatible with ground start operation when the customer's equipment is connected to the Central Office through a foreign exchange channel. A need further exists to obtain this answer supervision without relying on circuitry that detects an answer by analyzing tones, waveforms, and noise on a transmission line to detect when a call is completed.

SOLUTION TO THE PROBLEM

The present invention provides a solution to the stated problem by providing a first channel unit for a conventional channel bank that detects the reverse battery signal used for answer supervision signal and converts it to a digital format, and a second channel unit that detects the digitally formatted answer supervision signal, and regenerates a reverse battery signal towards a calling telephone or PBX. The first channel unit is located at a remote CO that is for some reason unable to serve the calling telephone equipment over metallic lines.

The first channel unit is coupled to a switch at the remote CO which is use to couple to a called party's CO switch that serves the called party's telephone equipment. The remote CO switch provides the first channel unit with voice and signalling information in analog format on conventional Tip and Ring leads. The first channel unit provides transmit A (TA) and transmit B (TB) outputs to the channel bank.

The channel bank transmits the TA and TB signals using robbed bit signalling on a pulse code modulated (PCM) carrier in the preferred system. The second channel unit decodes the A and B signal from the PCM carrier, and receives the A and B bits on receive A (RA) and receive B (RB) leads. In a preferred embodiment, a predetermined state of the A and B bits causes the second channel unit to generate a reverse battery voltage on Tip and Ring leads of the calling telephone equipment.

SUMMARY OF THE INVENTION

Briefly stated, a system for supervising a telephone connection using over a pulse code modulated carrier network between a first customer's equipment and a second customer's equipment is provided. A first channel unit is located in a channel bank at a Central Office (CO) or subscriber line carrier (SLC) hut serving the first customer's telephone equipment, or located on the first customer's premises.

A second channel unit is located in a channel bank at a remote CO and coupled to a switch at the remote CO that provides reverse battery answer supervision capability. The second channel unit includes a means for detecting a reverse battery signal generated by the remote CO switch, and a means for converting the supervisory signal into a digital supervisory signal. The second channel unit transmits the digital supervisory signal, preferably using the A and B signalling bits on a pulse code modulated carrier system. The switch at the remote CO is coupled to a CO switch that serves the second customer's equipment through a conventional metallic connection to the second customer's equipment.

The first channel unit includes an input coupled the PCM carrier and an output coupled to the first customer's telephone equipment. The first channel unit receives the digital supervisory signal and converts the digital supervisory signal to a reverse battery signal, and provides the reverse battery signal to the first customer's telephone equipment. The first channel bank includes circuitry for establishing a connection with the calling telephone or PBX independently of the remote Central Office.

DESCRIPTION OF THE DRAWINGS

FIG. 4b shows a state table indicating logic values occurring during operation of the system shown in FIG. 3 and FIG. 4a;

DETAILED DESCRIPTION

Overview

Although the telephone system's primary purpose is to deliver voice or message information between customers, the network must also handle a large amount of control information to direct calls and to provide special services to customers. As used herein, the term "signal" refers to either analog or digital data used for control purposes, as opposed to voice or message data. Answer supervision is a signal provided to indicates when a called party has answered a telephone. The answer supervision protocol of the present invention, which is particularly adapted to the AT&T DS1 system and D4 channel bank, supervises a communications link between a first customer's telephone equipment 11 of FIG. 1 and a second customer's telephone equipment 17.

An answer supervision signal only affects the telephone equipment that is attempting to place a telephone call, and the answer supervision information flows from the called telephone equipment to the calling telephone equipment. Accordingly, the answer supervision system and method of the present invention is described in terms of a first customer attempting to call a second customer, but it should be understood that the equipment described must be able to receive as well as send telephone calls, as well as perform conventional telephone functions.

Figure 2:
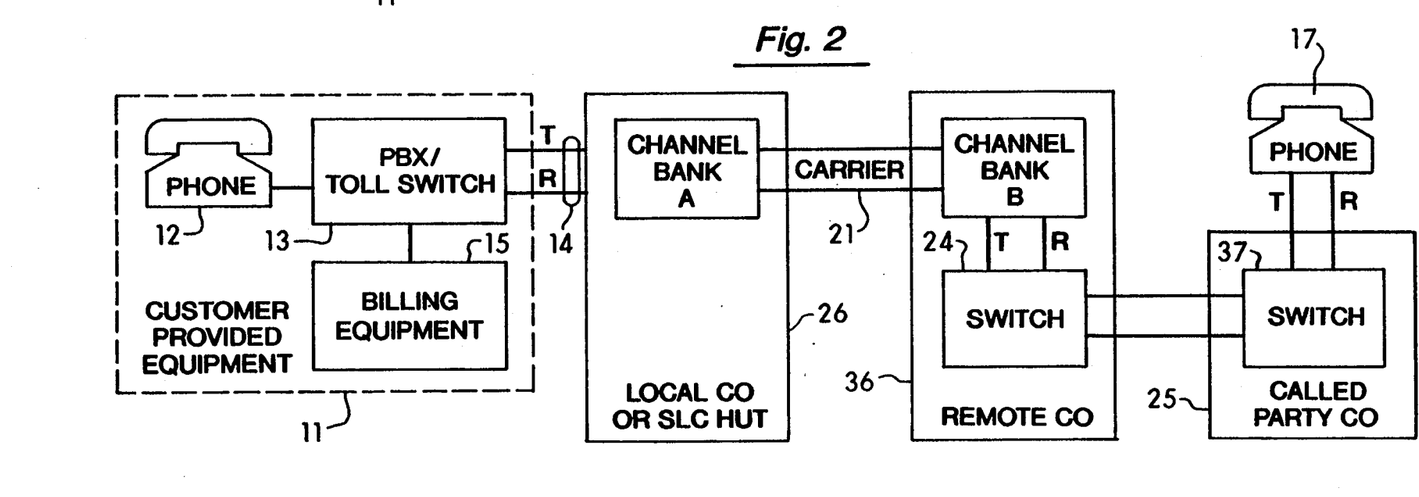
FIG. 2 shows a block diagram of a pulse code modulated carrier network including answer supervision in accordance with the present invention.

FIG. 2 illustrates a simplified telephone network using a digital carrier, such as a T-carrier system to extend service from geographically remote Central Office (CO) 36 to the CPE 11. In some instances CPE 11 is close to a geographically close CO switch, but the present invention in needed where this geographically close CO does not include a switch that provides a reverse battery answer supervision signal. In other instances, it is not cost effective for the telephone company serving CPE 11 to provide a geographically close CO having a switch with answer supervision capability. In either instance, if the telephone company that serves CPE 11 desires or is required to provide answer supervision capability to CPE 11, it must connect to a remote CO that has a switch with answer supervision capability.

Customer provided equipment (CPE) 11 is connected by Tip (T) and Ring (R) leads of metallic network 14 to channel bank A located at premises 26. Premises 26 may be a nearby CO or a subscriber loop carrier (SLC) hut owned by the telephone company, or may be the customer's premises depending on the preferences of the customer and telephone company.

Channel bank A may be, for example, a D4 channel bank provided by AT&T, or equipment that provides a similar service. Channel bank A prepares voice data and signal data from a number of customers, from equipment such as CPE 11, for transmission on digital carrier 21. Digital carrier 21 is preferably a T-carrier transmission line, but the present invention will find equal utility on other well known digital transmission lines.

The other end of carrier 21 is connected to a remote CO 36, which is termed "remote" because it is usually geographically distanced from CPE 11. The classification of Central Office 36 as remote is for purposes of description only, as remote CO 36 may be geographically close to CPE 11. CO 36 is "remote" for the purposes of the present invention if it is coupled, for any reason, to CPE 11 through a digital carrier rather than a metallic network. Remote CO 36 includes a channel bank B which includes a number of channel units described in greater detail in FIG. 3 and FIG. 5. Channel bank B converts the digital information on carrier 21, decodes the digital information to divide it among the number of channel units, and separates digital signal data from digital voice data. Some of the signal data is used to control switch 24 at remote CO 36 and to control a switch 37 at the called party's CO 35 which makes an electrical connection to Tip and Ring leads of telephone 17, as described hereinbefore. For ease of description, the called telephone equipment 17 is illustrated as a conventional telephone, but it should be understood that called equipment 17 may include a PBX or other conventional equivalents to a telephone.

Figure 3:
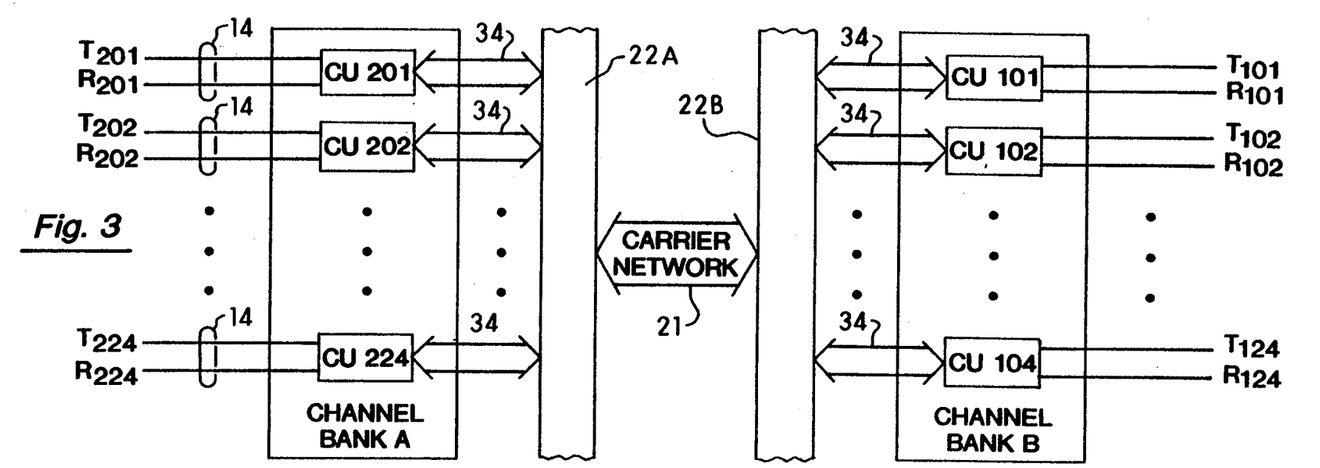
FIG. 3 illustrates a pair of channel banks for providing answer supervision in accordance with the present invention.

Channel bank A and channel bank B each comprise a number of channel units 101–124 and 201–224, respectively, that are interconnected by common equipment 22a and 22b, as shown in FIG. 3. The D4 channel bank, for example, comprises twenty-four channel units 101–124 and 201–224, although greater or fewer numbers of channel units might be included in channel bank A and channel bank B. Each channel unit 101–124 and 201–224 services a single customer's equipment, such as CPE 11 and CPE 17 shown in FIG. 1, during a telephone connection. Each channel unit 101–124 and 201–224 receives analog voice and signal information on Tip leads T101–T124, T201–T224 and Ring leads R101–R124, R201–R224. After converting the analog information into digital format, each channel unit 101–124 and 201–224 sends the digital data over a bus 34 to channel bank common equipment 22a and 22b. Channel bank common equipment combines the digital data from each channel unit into a serial data stream using time division multiplexing and conditions the data for transmission on carrier network 21.

Each channel unit 101–124 and 201–224 also receives PCM voice and signal data transmissions from common equipment 22a and 22b over a bus 102. Channel units 101–124 and 201–224 convert the digital voice data into analog waveforms which are delivered on Tip leads T101–T124, T201–T224 and Ring leads R101–R124, R201–R224 to the customer provided equipment such as CPE 11 and CPE 17 in FIG. 1.

Some of the channel units 101–124 and 201–224 are modified according to the teachings of the present invention and some are not. Regardless of the mixture between the modified and existing channel units 101–124 and 201–224, the answer supervision protocol of the present invention is fully transparent to the conventional operation of the digital carrier system. However, with respect to the channel units having answer supervision circuitry in accordance with the present invention, the answer supervision signalling is delivered and received.

Channel bank A preferably includes a foreign exchange (FX) which comprises a channel unit within channel bank A that is called a foreign exchange station (FXS). A foreign exchange is an increasingly popular means of accessing a telephone network that creates an illusion that CPE 11 is serviced by remote Central Office 36. In other words, CPE 11 may be accessed by dialing a number that is a local call in the area serviced by Central Office 36. In a foreign exchange, CPE 11 ordinarily relies on supervisory and control signals provided by remote Central Office 36. In the past, because CPE 11 accesses remote Central Office 36 through a PCM carrier 21, however, not all of the supervisory and control signals could be delivered from remote CO 36 to CPE 11.

For purposes of discussion, channel units 124 and 224 are FX channel units modified to provide answer supervision in accordance with the present invention. Channel unit 224 which serves calling CPE 11 from premises 26 is referred to as a Foreign exchange Station with Answer Supervision (FXSAS). Channel unit 124 located in channel bank B at remote CO 36 is referred to as a Foreign eXchange Office with Answer Supervision (FXOAS). An important feature of the present invention is that channel unit 224 that is modified in accordance with the present invention is able to convert digital signal data received from bus 34 into an analog or direct current signal on Tip lead T 224 and Ring lead R 224.

The preferred answer supervision system described in reference to FIG. 1–FIG. 3 provides answer supervision to a PBX 13 or to automatic billing equipment 15 coupled to PBX 13. Other telephone equipment cable of recognizing the answer supervision signal can make equal use of the system in accordance with the present invention. Although the preferred embodiment system generates a reverse battery signal towards the calling customer's equipment CPE 11, other direct current or analog signals might be equally useful. The invention is described in terms of channel units interfacing with a D4 channel bank, but other digital carriers are known and may be used with the present invention. Likewise, the answer supervision system of the present invention is particularly useful for foreign exchange channel units mounted in a channel bank, but it should be understood that the system can be effectively implemented by integrating the answer supervision circuitry into the calling customer's telephone equipment.

Answer Supervision System of the Present Invention

Figure 4A:
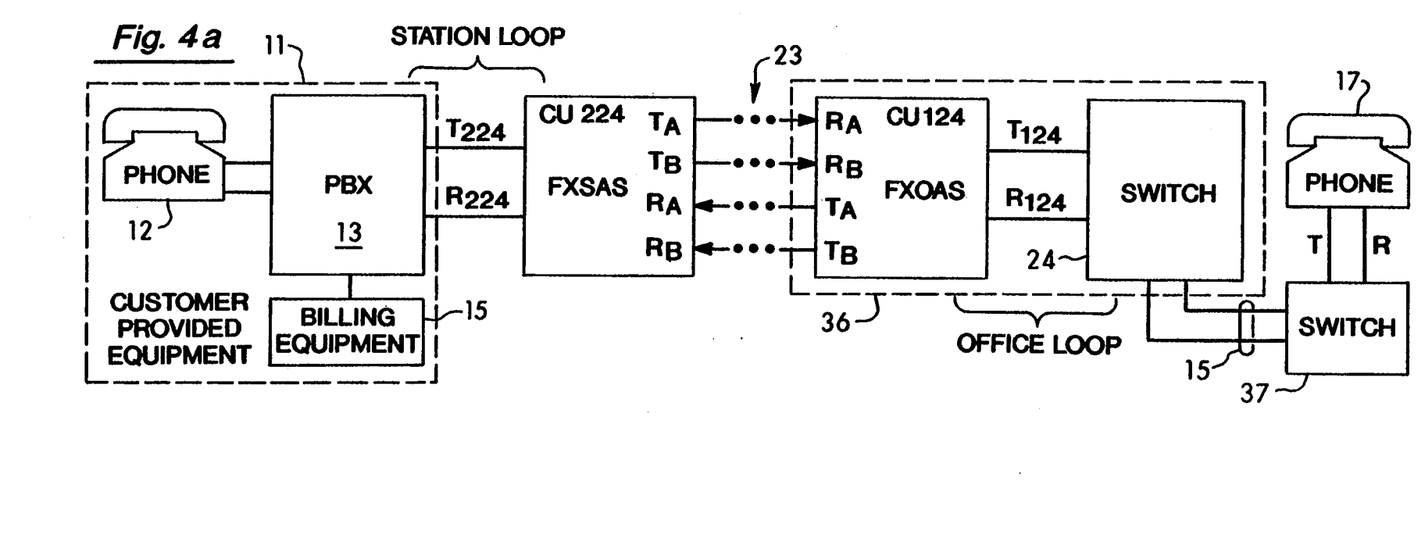
FIG. 4a shows a simplified block diagram illustrating a portion of the system in accordance with the present invention shown in FIG. 3.

FIG. 4a is a simplified block diagram showing a single pair of FXSAS and FXOAS channel units, without showing the intervening channel bank common equipment and carrier network of FIG. 3. Bus 34 (shown in FIG. 3) includes, among many other leads, four lines indicated generally at 23 for transmitting and receiving A and B signalling bits. A/B signalling, also known as "robbed bit" signalling, is well known in the telephony art. In brief, one bit of the digitized voice data is periodically "robbed" and replaced by an A signalling bit. Likewise, another bit of the digitized voice data is periodically replaced by a B signalling bit. The A and B bits are used to transfer information about the progression of events when a connection between two telephones. For example, the A and B bits are conventionally used to signify the status of a customer's equipment during a ground start or loop start protocol.

Channel Unit 224 includes two input RA and RB for interfacing to the channel bank A common equipment shown in FIG. 3. Channel Unit 224 also includes two outputs TA and TB for interfacing to the channel bank A common equipment shown in FIG. 3. Channel Unit 124 includes two outputs TA and TB for interfacing to the channel bank B common equipment shown in FIG. 3, and two outputs TA and TB for interfacing to the channel bank A common equipment shown in FIG. 3.

One function of channel bank common equipment 22a (shown in FIG. 3) is to decode the A and B bits from the digital data received on carrier network 21 and deliver them to the RA and RB inputs of channel unit 224 and channel unit 124. Similarly, channel bank common equipment 22a encodes the A and B bits found on the TA and TB outputs of channel unit 224 and channel unit 124 transmits the encoded digital signal on carrier network 21. In other words, because what is transmitted by Channel Bank A is received by channel bank B, in effect TA and TB of channel unit 224 are coupled to RA and RB of channel unit 124. Likewise, TA and TB of channel unit 124 are in effect coupled to RA and RB of channel unit 224. These connections are implied by the dotted couplings shown in FIG. 4a.

Figure 4B:
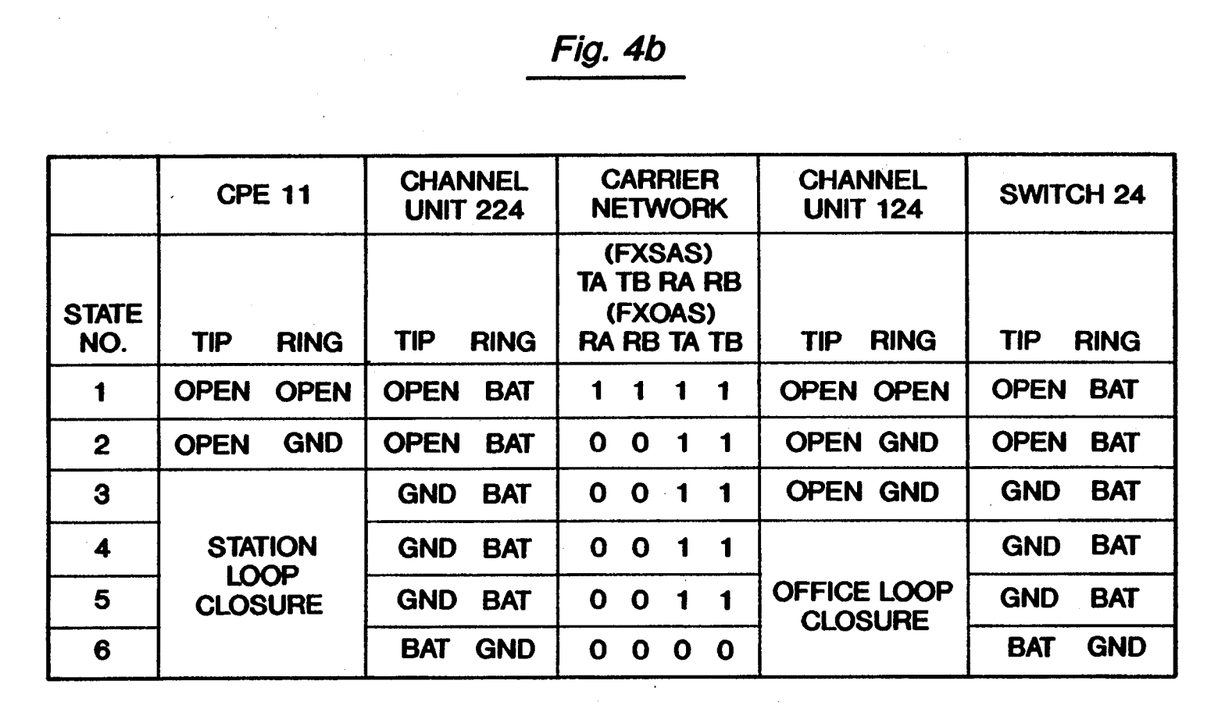

FIG. 4b sets out the outputs of channel unit 224 (FXSAS) towards CPE 11 in the station loop shown in FIG. 4a. FIG. 4b also show outputs of channel unit 124 (FXOAS) towards remote CO 36 in the office loop shown in FIG. 4a. The outputs of channel units 124 and 224 are in response to the logic states present on A/B signalling lines 23 in FIG. 4a. The answer supervision protocol of the present invention is best understood with reference to FIG. 4a in conjunction with the table shown in FIG. 4b.

Logic "high" states are represented in FIG. 4b by a binary "1" while logic low states are represented by a binary "0". It should be understood that FIG. 4b shows logic states A and B using an "active low" scheme in which the logic states are logic high in an idle state, but this choice is arbitrary. An "active high" signal level is described with a similar state table, but each of the logic levels opposite of that shown in FIG. 4b. Accordingly, the scope of the present invention includes implementation with either active high or active low logic levels for the A and B signalling bits.

FIG. 4b indicates various states numbered 1 through 7 that occur during a connection of a telephone call originating at CPE 11 through the station loop towards channel unit 224 (FIG. 4a) using a ground start protocol. State No. 1 is an idle condition where Tip and Ring leads of CPE 11 in the station loop are open, Tip and Ring leads of CPE 17 in the office loop are open, and the A and B signalling bits of both channel unit 224 and channel unit 124 are logic high. In the idle state no. 1 channel unit 224 has an open Tip lead and a battery voltage (−48 V) applied to the Ring lead, while channel unit 124 has both Tip and Ring leads open. The system remains in the idle condition illustrated by state no. 1 until CPE 11 attempts to initiate a call by making connection through the station loop to channel unit 224 (FXSAS in FIG. 4a).

In state no. 2 CPE 11 initiates a connection by placing the Ring lead in the station loop in FIG. 4a to ground. Because channel unit 224 maintains the its ring lead at battery potential, a current flows in the ring lead as a result of the Ring-ground by CPE 11. Channel unit 224 (FXSAS) senses this current, interpreting it as a connection request, and responds to this connection request by changing its TA and TB bits to logic low, and applying ground (GND) to the Tip lead as shown in state no. 3. At this point the station loop between the CPE 11 and channel unit 224 is closed.

An important feature of the present invention is that while channel unit 224 responds to CPE 11 by taking action to close the station loop it simultaneously transmits A and B signalling bits at a logic low to initiate the connection request for office loop closure between channel unit 124 and central office 36 in FIG. 4a. Prior channel units rely on switch 24 in CO 36 to provide the ground start signalling information as the prior art channel unit serves merely as a conduit for the information. In accordance with the present invention, however, channel unit 224 incorporates some of the functions of switch 24 and performs ground start signalling independent of switch 24. This feature of the present invention simplifies the ground start protocol in some respects by integrating some of the functions and timing normally provided by CO 36 into channel unit 224.

In states 1–3 in FIG. 4b the office loop between channel unit 124 and remote central office 36 remains idle. In the idle condition, CO 36 applies a battery to the Ring lead towards channel unit 124 (FXOAS) during idle to aid in detecting a request to connect. Channel unit 124 receives the A and B signalling bits on its RA and RB lines.

As shown in state no. 2 in FIG. 4b, when channel unit 124 receives the A and B signalling bits in a logic low state, it initiates a connection with remote CO 36 by connecting the Ring lead to ground in the office loop. Central Office 36 responds to the connect request by applying battery to the Ring lead and ground to the Tip lead as shown in state no. 3 in FIG. 4b. At this point channel unit 124 responds with a loop closure and the office loop is closed and the system is up for dialing. It should be noted that because the station loop is closed independently by channel unit 224, the station loop signals need not change during state no. 3 through state no. 5. CPE 11 need not generate any DC signal on tip and ring leads after the station loop closure, as indicated in FIG. 4b.

CPE 11 issues dialing instruction in pulse or dual tone multifrequency (DTMF) signals, which pass through channel units 224 and 124 to CO 36. DTMF instructions pass through the voice channel without changing the states of the A and B signalling bits, while pulse information does briefly effect the A and B signalling bits. CO 36 includes a switch 24 that responds to the dialing instructions to make a connection to CPE 17 through switch 37 at called party CO 25. As set out hereinbefore, if CPE 17 is off-hook (busy) switch 37 generates a busy signal which is returned on the voice channel to CPE 11. If CPE 17 is on-hook, switch 37 applies ground potential to the Tip lead of channel unit 124, ringing on the ring lead towards CPE 17, and returns an audible ringing tone to CPE 11 during state no. 5 in Table 1.

Turning to state no. 6 in FIG. 4b, when CPE 17 answers or goes off hook switch 37 communicates the answer supervision information through interoffice pipeline 15 to switch 24 in remote CO 36. Switch 24 generates a reverse battery signal in the office loop towards channel unit 124 by applying battery to the Tip lead and ground to the Ring lead. Until now, this reverse battery signal could go no farther than to equipment connected to CO 36 by metallic interconnections.

In accordance with the present invention, however, channel unit 124 responds to the reverse battery signal by changing its TA and TB bits to logic low (active) as shown in state no. 6 in FIG. 4b. Channel unit 224 receives the A and B signalling information on its RA and RB lines. Channel unit 224 includes logic for recognizing when both its TA and TB bits are logic low and the RA and RB bits are logic low, indicating a unique condition when a called party has answered the phone. Channel unit 224 responds to this digital answer supervision signal by generating a reverse battery signal in the station loop towards CPE 11 shown in FIG. 4a. Because CPE 11 and channel unit 224 are coupled by metallic interconnect, CPE 11 receives the reverse battery signal as if it had been metallically coupled to switch 24 at CO 36. In other words, CPE 11 can respond to the reverse battery signal by starting a timer or other equipment such as billing equipment 15 for accurately billing the customer using phone 12.

A call is terminated by returning the system to the idle state 1. This can be initiated by either the calling telephone or the called telephone going back on hook.

Details of the Channel Units

Figure 5:
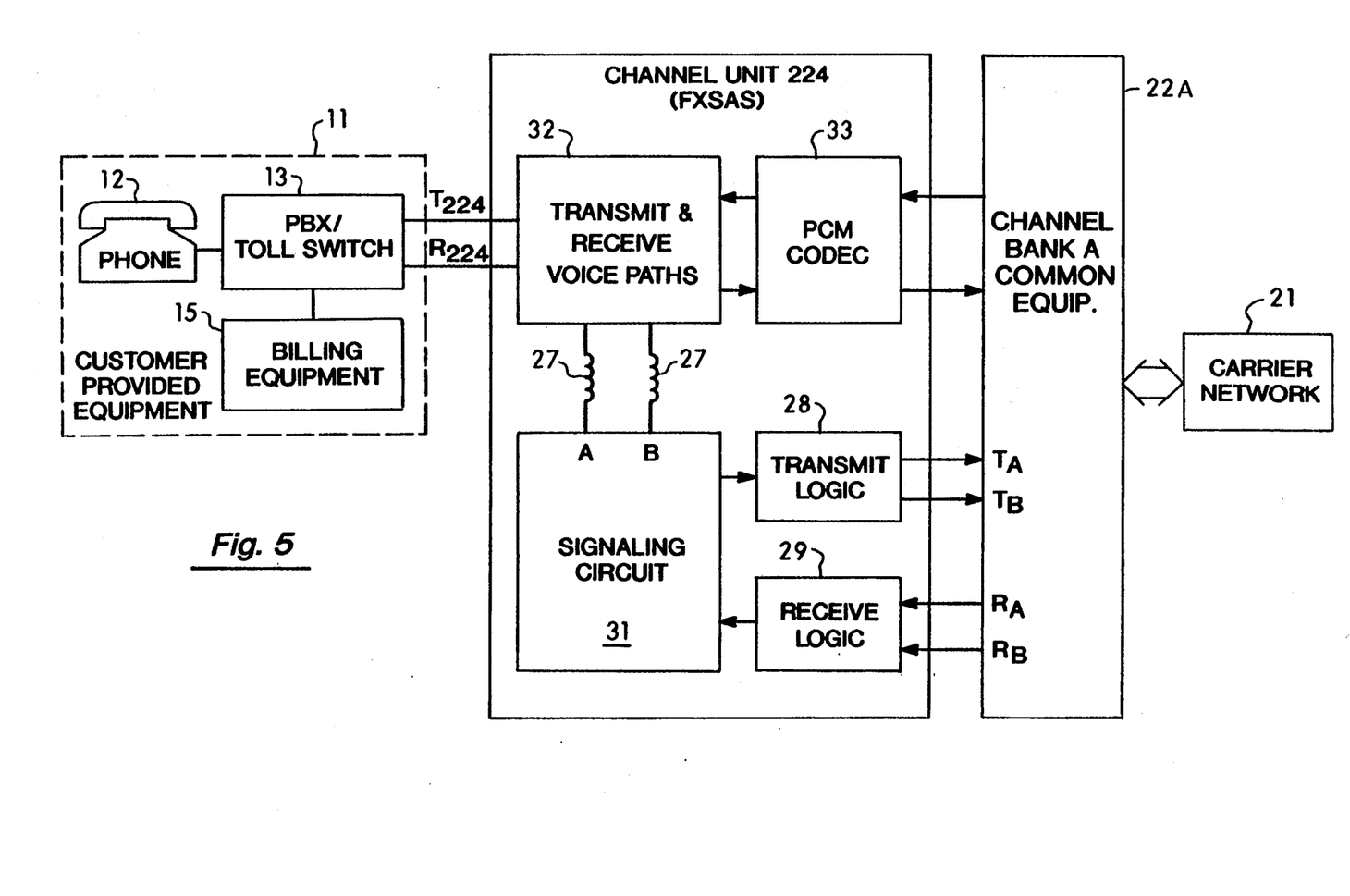
FIG. 5 sets forth a more detailed block diagram of a foreign exchange station channel unit including answer supervision circuitry in accordance with the present invention.
Figure 6:
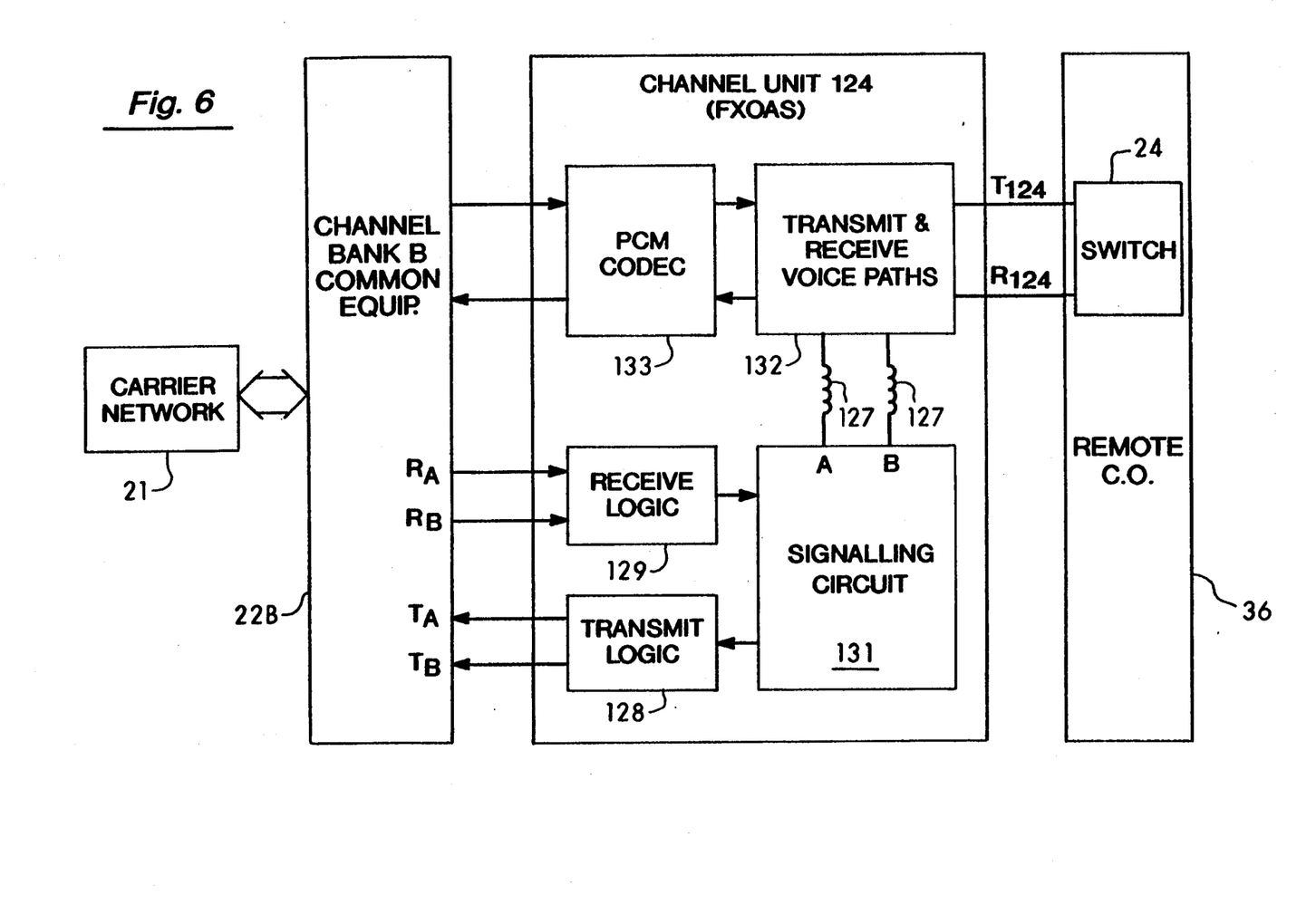
FIG. 6 sets forth a more detailed block diagram of a foreign exchange office channel unit including the answer supervision circuitry in accordance with the present invention.

FIG. 5 and FIG. 6 illustrate the two separate channel units 224 and 124 of the present invention in greater detail. In FIG. 5, channel unit 224 includes transmit and receive voice paths 32, PCM codec 33, retard coils 27, transmit logic 28, and receive logic 29. Transmit and receive voice paths 32 are connected to the Tip and Ring leads of CPE 11 by metallic interconnects coming into channel unit 224. Transmit and receive voice paths 32 provide gain, filtering, and similar signal conditioning functions to voice signals in a manner familiar to those skilled in the telephony arts. Transmit and receive voice path 32 outputs analog voice or message information to PCM codec 19. Similarly, transmit and receive voice path 32 receives analog voice information from PCM codec 33 for transmission to CPE 11.

PCM codec 33 serves to convert the analog voice information received from voice paths 32 into digital voice data using well known analog to digital conversion techniques. Also, PCM codec 33 converts digital voice data into analog voice information for transmission through voice paths 32 to CPE 11. Both digital to analog and analog to digital conversion are well known techniques that need not be discussed in greater detail to understand the present invention.

PCM codec 33 is coupled to channel bank A common equipment 22a to transmit and receives digital voice data. As described hereinbefore, channel bank A common equipment 22a serves to combine digital data provided by many channel units by time division multiplexing into a digital data stream. Channel bank A common equipment 22a is also coupled to transmit logic 28 and receive logic 29 through the A and B signalling lines TA, TB, RA, and RB. Channel bank A common equipment 22a receives A and B signalling bits on TA and TB and employs robbed bit signalling to incorporate the A and B bits into the digital data stream. Also, channel bank A common equipment 22a decodes the A and B signalling bits from an incoming digital data stream, and presents the A and B signalling bits on the RA and RB lines to receive logic 29.

Receive logic 29 has an output coupled to signalling circuit 31. Receive logic 29 and signalling circuit 31 work together to implement the state machine described hereinbefore in reference to FIG. 4b. Signalling circuit 31 generates outputs such as battery voltage and ground voltage that are applied to the Tip and Ring leads of CPE 11 through retard coils 27 and transmit and receive voice paths 18. The circuitry required to generate these signals is well known in channel units that follow ground start signalling protocol.

Signalling circuit 31 includes sensing circuitry to monitor voltages on the Tip and Ring leads of CPE 11. Retard coils 27 which couple signalling circuit 31 to voice paths 32 serve to filter out voice signals which might otherwise be misinterpreted as signalling information by signaling circuit 31. Signalling circuit 31 generates an output to transmit logic 28 that directs transmit logic 28 to set the A and B signalling bits on the TA and TB lines. The sensing and signalling circuitry is well known and used in conventional channel units to provide A and B signalling.

Signalling circuit 31 also includes capability for applying the reverse battery signal to Tip and Ring leads of CPE 11. Although circuitry for applying reverse battery is, until now, not included in FX channel units, the circuitry modifications to conventional channel units are not complex and are within the ordinary skill of the telephone equipment designer. For example, the signal can be provided by field effect or bipolar transistors that respond to the input from receive logic 29 and transmit logic 28 by coupling battery to the Tip lead and ground to the Ring lead when TA, TB, RA and RB are in the appropriate state (i.e. all at logic low in the preferred embodiment).

In FIG. 6, channel unit 224 includes transmit and receive voice paths 132, digital signal processor (PCM codec) 133, retard coils 127, transmit logic 128, and receive logic 129. Transmit and receive voice paths are connected to the Tip and Ring leads of switch 24 located in remote CO 36. Transmit and receive voice paths 132 provide gain, filtering, and similar signal conditioning functions to voice signals in a manner similar to voice paths 32 in FIG. 5. Transmit and receive voice path 132 outputs analog voice or message information to PCM codec 133 and receives analog voice information from PCM codec 133 for transmission to switch 24 in remote CO 36.

PCM codec 133 is coupled to channel bank B common equipment 22b to transmit and receives digital voice data. Channel bank B common equipment 22b functions in a manner similar to common equipment 22a described in reference to FIG. 5. In the preferred embodiment, both channel bank A and B common equipment are identical equipment from a D4 channel bank. Channel bank B common equipment 22a is also coupled to transmit logic 128 and receive logic 129 through the A and B signalling lines TA, TB, RA, and RB.

Receive logic 129 has an output coupled to signalling circuit 131. Receive logic 129 and signalling circuit 131 work together to implement the logic functions described hereinbefore in reference to FIG. 4a and FIG. 4b. Signaling circuit 131 includes sensing circuitry to monitor voltages on the Tip and Ring leads of switch 24 located at remote CO 36. Retard coils 127 which couple signalling circuit 131 to voice paths 132 serve to filter out voice signals which might otherwise be misinterpreted as signalling information by signaling circuit 131. Signalling circuit 31 generates an output to transmit logic 28 that directs transmit logic 28 to set the A and B signalling bits on the TA and TB lines. In addition to well known circuitry required to generate for ground start signalling protocol, signalling circuit 131 and in particular transmit logic 128 include logic for generating A and B bits of a predetermined state when signalling circuit 131 senses reverse battery on Tip and Ring leads of switch 24 in remote CO 36. Although prior channel units do not include this signalling and logic function, implementation is not complex and can be implemented with minimal experimentation.

In conclusion, it can be observed that the channel units 224 and 124 when modified according to the teachings of the present invention discussed above, provide answer supervision to a calling customer's telephone equipment based upon the A and B signalling protocol discussed herein. The channel unit 224 coupled to the calling customer's equipment provides a reverse battery signal easily recognized by the calling equipment. The calling equipment can use the reverse battery signal to begin timing a telephone connection with to-the-second accuracy demanded by telephone users.

Answer Supervision Method of the Present Invention

In a telephone system using a pulse code modulated (PCM) carrier transmission line 21 to carry voice and signal data between a remote CO 36 and a customer's equipment CPE 11, direct current signals such as reverse battery answer supervision signal cannot be directly transferred across the transmission line. Referring again to FIG. 4a, switch 24 in remote CO 36 generates a reverse battery signal on Tip and Ring leads towards channel unit 124 when called CPE 17 goes off hook. Calling CPE 11 is coupled by a metallic connection to channel unit 224 which is preferably a foreign exchange station located at premises 26 (FIG. 2).

The answer supervision method in accordance with the present inventions communicates the reverse battery signal from switch 24 in remote CO 36 to channel unit 224 through PCM carrier transmission line 21. When a calling party at CPE 17 originates a call the answer supervision method in accordance with the present invention begins by converting the reverse battery signal at remote CO 36 into digital signal data.

Channel unit 124 then proceeds by encoding the digital signal data into the digital voice data at remote CO 36. Preferably the encoding step comprises a robbed A/B bit signalling protocol where the digital signal data is encoded into the robbed A and B bits. In the preferred embodiment, the A and B bits are both set to a logic low by channel unit 124 to signify the a reverse battery condition generated by CO 36.

Next, channel unit 124 transmits the encoded digital signal data with the digital voice data over PCM carrier transmission line 21. Channel unit 224 proceeds by decoding the digital signal data from the digital voice data, then regenerating the reverse battery signal in response to the decoded digital signal data. Finally, channel unit 224 completes the answer supervision signalling by transmitting the reverse battery supervisory signal to CPE 11 over the metallic connection to indicate that the called party has answered the calling party's call. CPE 11 may respond by initiating billing in billing equipment 15 upon receipt of the reverse battery signal.

It is to be expressly understood that the claimed invention is not to be limited to the description of the preferred embodiment but encompasses other modifications and alterations within the scope and spirit of the inventive concept.

I claim:

1. A foreign exchange system for providing answer supervision for a telephone connected to remote central office through a foreign exchange station (FXS), the FXS connected over a pulse code modulated carrier to a foreign exchange office (FXO) at the remote central office (CO), wherein the FXO is coupled to a second customer's equipment through a telephone network, the system comprising:

means coupled to the second customer's equipment for generating a direct current supervisory signal in response to an identified status of the second customer's equipment;

first converting means located in the FXO and for receiving the direct current supervisory signal from the generating means and for converting the direct current supervisory signal into digital signal data;

a pulse code modulated (PCM) carrier having a first end coupled to the converting means and having a second end, the PCM carrier being receptive of the digital signal data for transmitting the digital signal data from the first end to second end;

a second converting means located in the FXS and having an input coupled to the second end of the PCM carrier system and an output metalically coupled to the first customer's equipment for converting the transmitted digital signal data into a direct current supervisory signal, wherein said first customer's equipment includes means coupled to the means for converting for responding to the direct current supervisory signal.

2. The system of claim 1 wherein the first customer's equipment comprises a private branch exchange.

3. The system of claim 1 wherein the means for converting the digital signal data into a direct current supervisory signal is located in a channel unit of a channel bank at a telephone company central office.

4. The system of claim 2 wherein the means for converting the digital signal data into a direct current supervisory signal is located in the PBX.

5. The system of claim 1 further comprising means coupled to the first customer's equipment for transforming analog voice data provided by the first customers equipment into PCM voice data and means coupled to the means for transforming and to the first converting means for combining the PCM voice data with the digital signal data.

6. The system of claim 5 wherein the means for combining uses robbed bit signalling in which the digital signal data is encoded into a least significant bit of selected portions of the PCM voice data.

7. The system of claim 1 wherein the direct current supervisory signal comprises a reverse battery condition generated by the means for generating when the second customer's equipment goes off hook.

8. The system of claim 7 wherein the means for responding comprises a timer for monitoring the length of the connection.

9. In a telephone system including a foreign exchange having a pulse code modulated (PCM) carrier transmission line coupled between a first channel unit serving a calling customer and a second channel unit located at remote central office for transmitting digital voice data, wherein a switch at the remote central office generates a reverse battery signal when a called telephone is answered in response to a call initiated by customer provided equipment, wherein the customer provided equipment is coupled by a metallic connection to the first channel unit, the call originating from a calling party at the customer provided equipment, a method for communicating the reverse battery signal from the switch at the remote central office across the foreign exchange to the first channel unit through the PCM carrier transmission line, the method comprising the steps of:

converting the reverse battery signal at the remote central office into digital signal data;

encoding the digital signal data into the digital voice data at the remote central office;

transmitting the encoded digital signal data with the digital voice data over the foreign exchange using the PCM carrier transmission line;

decoding the digital signal data from the digital voice data at the first channel unit;

regenerating the reverse battery signal at the first channel unit in response to the decoded digital signal data;

transmitting the reverse battery signal to the customer provided equipment over the metallic connection; and initiating billing of the calling party at the customer provided equipment for the call upon receipt of the reverse battery signal.

10. In a telephone system having a foreign exchange, the foreign exchange including a pulse code modulated (PCM) carrier transmission line coupled between a first channel unit located at a premises near a calling customer's telephone equipment and a remote central office for transmitting digital voice data, wherein the remote central office generates a reverse battery signal when a called telephone is answered in response to a call initiated by the calling customer's telephone equipment which is coupled by a metallic connection to the first channel unit, the call originating from the calling customer at the customer telephone equipment, a method for communicating the reverse battery signal from the remote central office across the foreign exchange to the calling customer's telephone equipment through the PCM carrier transmission line, the method comprising the steps of:

converting the reverse battery signal at the remote central office into digital signal data;

encoding the digital signal data into the digital voice data at the remote central office, wherein the encoding step comprises a robbed A/B bit signaling protocol wherein the digital signal data is encoded into the robbed A and B bits;

transmitting the encoded digital signal data with the digital voice data over the foreign exchange using the PCM carrier transmission line;

decoding the digital signal data from the digital voice data at the first channel unit;

regenerating the reverse battery signal by the channel unit in response to the decoded digital signal data; and transmitting the reverse battery supervisory signal to the customer provided equipment over the metallic connection to indicate that the called party has answered the calling party's call.

11. The method of claim 10 wherein the digital signal data corresponding to the reverse battery condition comprises a logic low state for the A signalling bit and a logic low state for the B signalling bit.

12. A foreign exchange system for making and monitoring a telephone call from a calling party's equipment to a called party's equipment on a telephone network, the called party's equipment having Tip and Ring leads coupled to a called party's central office (CO) switch and the called party's CO switch is coupled by an interoffice pipeline to a remote CO switch, wherein the remote CO switch is capable of generating a direct current signal, the network including a foreign exchange having a pulse code modulated (PCM) carrier transmission line connecting the remote CO switch and the first customer's equipment, the system comprising:

a first channel unit coupled to the remote CO switch, and having a transmit A (TA) lead, transmit B (TB) lead, receive A (RA) lead, and receive B (RB) lead;

a second channel unit connected to Tip and Ring leads of the first customer's equipment and having a transmit A (TA) lead, transmit B (TB) lead, receive A (RA) lead, and receive B (RB) lead, wherein the TA lead of the first channel unit sends data through the PCM carrier to the RA lead of the second channel unit, the TB lead of the first channel unit sends data through the PCM carrier to the RB lead of the second channel unit, the RA lead of the first channel unit receives data through the PCM carrier from the TA lead of the second channel unit, and the RB lead of the first channel unit receives data through the PCM carrier from the TB lead of the second channel unit;

means included in the first channel unit and coupled to the remote CO switch for detecting a direct current signal generated by the remote CO switch indicating the second customer's equipment is off hook;

means included in the second channel unit and coupled to the Tip and Ring leads of the first customer's equipment for generating a direct current signal on the Tip and Ring leads of the first customer's equipment in response to a predetermined state on the RA and RB leads of the second channel unit.

13. The system of claim 12 wherein the first channel unit is located in a first channel bank geographically remote from the calling party's equipment and the second channel unit is located at the premises of the calling party.

14. The system of claim 13 wherein the first and second channel units further comprise means for converting voice and message waveforms into digital voice data.

15. The system of claim 14 wherein the first channel bank comprises means coupled to the first channel unit for combining the data on the TA and TB leads of the first channel unit with the digital voice data using robbed bit signalling.

16. The system of claim 12 wherein the first and second channel units each include means coupled to the RA, RB, TA, and TB leads for performing ground start signalling.

17. The system of claim 12 wherein the second channel unit is provided integrally with the second customer's equipment.

* * * * *